No. 709,324.　　　　　　　　　　　　　　　　Patented Sept. 16, 1902.
A. HONRATH.
PUNCTURE PROOF INFLATABLE WHEEL.
(Application filed May 20, 1902.)

(No Model.)　　　　　　　　　　　　　　　　　　　2 Sheets—Sheet 1.

Fig. 1.

Fig. 2.

WITNESSES:
H. Walker

INVENTOR
Alexander Honrath
BY
Munn
ATTORNEYS.

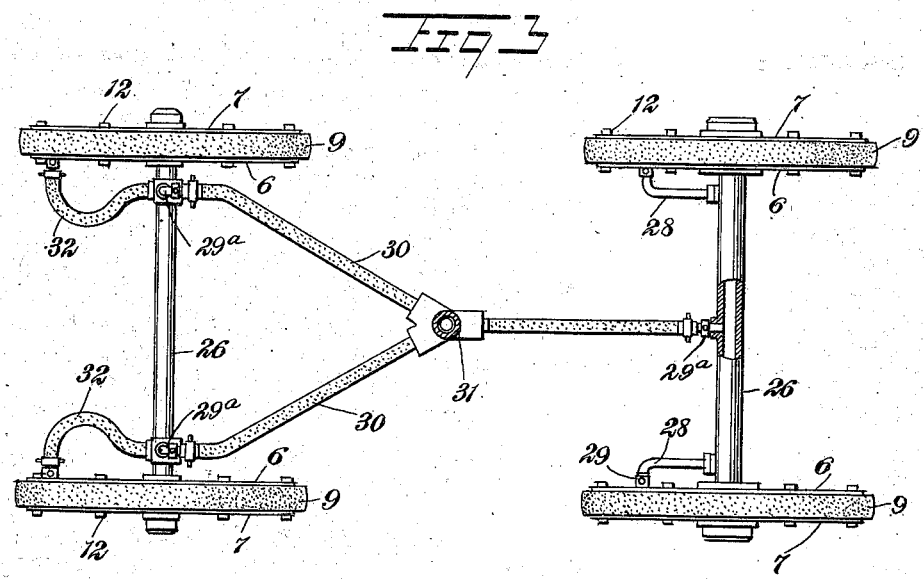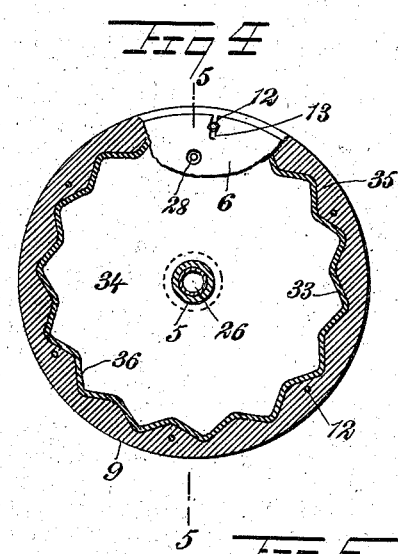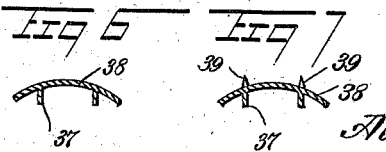

UNITED STATES PATENT OFFICE.

ALEXANDER HONRATH, OF KIOWA, INDIAN TERRITORY.

PUNCTURE-PROOF INFLATABLE WHEEL.

SPECIFICATION forming part of Letters Patent No. 709,324, dated September 16, 1902.

Application filed May 20, 1902. Serial No. 108,210. (No model.)

*To all whom it may concern:*

Be it known that I, ALEXANDER HONRATH, a citizen of the United States, and a resident of Kiowa, in the Choctaw Nation and Indian Territory, have invented new and useful Improvements in Puncture - Proof Inflatable Wheels, of which the following is a full, clear, and exact description.

My invention relates to improvements in inflatable wheels adapted for use on automobiles, buggies, light road-vehicles, bicycles, and other kinds of vehicles; and one object that I have in view is the provision of a simple and substantial construction which may be inflated easily and which is practically puncture-proof, thus producing a structure which affords resilient support to the superimposed load and is especially adapted for long-distance runs over ordinary roads.

Further objects of the invention are to secure uniformity in the distribution of fluid-pressure to several cells or compartments of a cellular-structure wheel, to enable the cells to be supplied with fluid under pressure while the apparatus is in motion, to minimize leakage of the inflating medium, to so combine the several parts as to prevent cutting or abrasion due to wear, to limit circumferential displacement of the tire and relative displacement of the inflatable pouches, and to provide a metallic protective tire for use on certain rough roads which may be liable to injure the elastic cushion-tire.

With these ends in view the invention consists in the novel combination, construction, and arrangement of parts, which will be hereinafter fully described, and the actual scope of the invention will be defined by the claims.

Reference is to be had to the accompanying drawings, forming a part of this specification, in which similar characters of reference indicate corresponding parts in all the figures.

Figure 1 is a side elevation of an inflatable wheel embodying my invention and showing certain parts broken away and in section. Fig. 2 is a transverse sectional view taken in the plane of the dotted line 2 2 of Fig. 1. Fig. 3 is a plan view of a running-gear for a vehicle, such as an automobile, and illustrating means for supplying the inflating fluid to a plurality of wheels. Fig. 4 is a sectional view through another form of the inflatable wheel, illustrating a single reservoir-chamber and a particular type of tire having interlocking connection with said reservoir-chamber, the plane of the section being indicated by the dotted line 4 4 of Fig. 5. Fig. 5 is a transverse section in the plane of the dotted line 5 5 of Fig. 4. Fig. 6 is a detail cross-section of a metallic rim applicable to the wheel when traveling over sandy or rocky roads, and Fig. 7 is another form of rim used on the tire to prevent slipping of the wheel on icy surfaces.

The improved wheel shown by Figs. 1 and 2 consists of a hub 5, the metallic side plates 6 7, a plurality of inflatable pouches 8, and an elastic cushion-tire 9, together with suitable means for holding or binding the several parts together.

The hub 5 is constructed of metal in the form of a bushing or sleeve, and at its end portions it is provided with the annular rims or flanges 10.

The side plates 6 7 are of sheet metal and substantially circular, as represented by Fig. 1, said plates being dished from the middle toward the circumference and provided with the flat circular edge portions, (indicated at 11 in Fig. 2.) The dished portions of the circular side members 6 7 are fitted snugly on the hub 5, within the end rims 10 thereof, and these side members have their edge portions 11 disposed in parallel positions. (See Fig. 2.)

The pouches 8 are made of rubber or other elastic material which is capable of expanding under the pressure exerted by an inflating medium, such as air or gas, and these pouches are of the segmental form represented more clearly by dotted lines in Fig. 1. Each pouch consists of side walls $8^a$, a rim $8^b$, an inner short wall $8^c$, and the end walls $8^d$, all of which may be made or otherwise formed of rubber or other plastic material. The pouches are compactly disposed between the side members 6 7, so that the side walls $8^a$ of said pouches will be supported laterally by said side members, while the inner ends $8^c$ of the pouches are seated upon the hub or bushing 5, while the end walls $8^d$ of the series of pouches are in the abutting relation shown by Fig. 1. It will thus be seen that the plurality of chambered pouches are disposed compactly within the wheel, so as to absorb or take up the space between the side members 6 7 and to extend from the hub nearly to the circumference of the wheel, the curved rims 8$^b$ of the series of pouches lying within and concentric to the rim portion formed by the straight edges 11 of the side members 6 7.

The cushion-tire 9 is made of rubber or other suitable material, and it is arranged between the rim portions 11 of the side members, said tire being seated upon the rims 8$^b$ of the inflatable pouches and connected by suitable means with the rim portions of the side members. I prefer to make the rim portions 8$^b$ of the inflatable pouches curved in cross-section, as shown by Fig. 2, and to provide the tire with an inner convex face which conforms to the transverse curvature of the outer edges of the pouches, all as shown by Fig. 2, whereby the tire is seated directly upon the pouches and is so related or connected thereto as to reduce the relative displacement of the tire and said pouches.

It will be seen that the tire, which is yieldable or compressible, has direct engagement with the elastic pouches that are adapted to afford a cushion to the tire, and as the tire is adapted to yield or give under the weight of the load and when striking obstacles in its path I find it necessary to employ yieldable connections between the said tire and the side members 6 7. One form of such yieldable connections consists in the employment of stay-bolts 12, arranged to pass through radial slots 13, which are provided coincidently in the rim portions 11 of the side members, said stay-bolts serving to hold the side members against spreading and to confine the yieldable tire properly within the wheel. These bolts 12 are incased within bushings 14, of any suitable material, said bushings being preferably of metal and embedded transversely within the yieldable tire 9. The bushings prevent the bolts from cutting the tire when the parts are subjected to undue shock, and the end portions of these bushings are exposed beyond the side edges of the tire, so as to engage with the rim portions 11 of the side members, thus making the bushings coöperate with the bolts in staying the metallic side members of the wheel.

As shown by Fig. 2, the side members may be provided with the ribs or projections 15 on the inner faces thereof, and these ribs are adapted to fit into grooves 16, formed in the side walls 8$^a$ of the pouches, whereby the latter will be held or retained against circumferential displacement within said metallic side members of the wheel.

From this description it will be seen that the pouches provide a plurality of independent chambers or cells within a wheel of cellular structure, and it becomes important to provide means whereby the series of pouches may be simultaneously and uniformly inflated. This end is attained in my invention by the provision of a wing-like distributing-pipe 17, the same adapted to be supported by any suitable means on the outside of one of the members of the wheel—as, for example, by the clip 18, which is attached to the side member 6. The annular distributing-pipe is arranged to loosely surround the hub portion of the wheel; but this pipe does not form a complete circle, because it is divided or interrupted at one point, as shown by Fig. 1, one end of said annular distributing-pipe being closed by a suitable cap 19. To the other end of this distributing-pipe is secured an offstanding branch 20 from a branch supply-pipe 21, the latter having the threaded end, as at 22, for the application of nipple or coupling of an inflating-pump in case it is desired to provide an external source of supply for the purpose of inflating the cells of the improved wheel. The annular distributing-pipe is provided with a series of branches 23, which correspond in number to the series of pouches 8, and these branches are attached or coupled to said distributing-pipe 17 at proper intervals, while the distant ends of the branches are extended or carried through holes 24, which are provided in the side member 6 at points opposite to the series of pouches. Said branches 23 are somewhat smaller than the holes 24, through which they are carried, in order to allow the desired radial movement of the pouches, and each branch is provided with a check-valve 25 of any suitable character.

In Fig. 2 of the drawings I have shown the inflatable wheel mounted on a hollow axle 26, the latter being in the form of a seamless tube and fitting snugly in the hub or bushing 5 of the wheel. The outer end of this axle 26 is adapted to be closed by a plug, cap, or nut 27 of any suitable type, and this axle may be arranged to rotate with the wheel, in which event the branch supply-pipe 21 may be attached to the axle, so as to communicate with the bore or chamber thereof, whereby the pipe 21 is adapted to transmit the fluid-pressure stored in the axle 26 to series of cells formed by the inflatable pouches and to compensate for the leakage of air which may take place, owing to imperfect joints or puncture of one of the cells.

In the embodiment of the invention shown by Fig. 3 I have represented a running-gear having hollow axles 26, adapted to support inflatable wheels of the character heretofore described, and communication between the hollow axles and the cell or cells of the wheels is established by means of pipes 28, the latter having communication, through a coupling 29, with the wheel and attached to a part of the axle, said pipes 28 having suitable check-valves 29$^a$ to prevent leakage of the inflating medium when the couplings 29 are detached. These axles 26 are adapted to serve as storage-reservoirs for highly-compressed inflating fluid, and the axles may be supplied with the fluid by means of the pipes or hose 30, which have communication with a common Siamese coupling 31. In lieu of the pipes 28 the axles may supply the inflating fluid through a removable hose 32, the latter having one end coupled detachably to the axle and its other end attached removably to the wheel for communication with the inflating-chamber therein, and in this type of running-gear I have found it desirable to employ an inflatable wheel having a single pouch 33, adapted to present a single continuous inflating-chamber 34, as shown by Figs. 4 and 5.

In order to minimize the tendency of the tire 9 to circumferentially creep or displace itself on the inflatable body of the wheel, I may provide the inner surface of the tire with a corrugated seat 35, adapted to frictionally engage with the corrugated rim 36 of the inflatable pouch or pouches, the corrugated form of the pouch and the tire being shown more clearly by Fig. 4.

In Fig. 6 I have represented a metallic tire 37, adapted to be fitted over the elastic tire 9 when the vehicle is intended to traverse rough or stony roads, and this metallic tire is provided with a broad tread-surface 38, adapted to penetrate the road-bed. This metallic tire, however, is employed only in cases of emergency and when the vehicle is traveling through a rough country, where the elastic tire 9 is liable to be cut or injured by the rough character of the road-bed.

The metallic rim shown by Fig. 7 is provided with a row or rows of spurs 39, projecting from the tread-surface 38 and adapted to take or stick into ice, &c., in order to prevent the wheel from slipping on sleet-covered surfaces of roads and pavements.

It will be understood that the coupling 31 (shown by Fig. 3) is connected by a suitable pipe with an air-pump or other means for supplying the inflating medium and that the latter is distributed by the pipes to both axles and the wheels. If desired, I may use a single pipe to connect the coupling 31 to the rear axle 26 instead of the double pipes, and thus each axle may connect with the coupling by a single pipe or hose.

Having thus described my invention, I claim as new and desire to secure by Letters Patent—

1. An inflatable wheel comprising a hub, side members rigid with said hub and having peripheral tire-flanges, a tire having its inner edge portion slidably confined between said flanges and movable relatively thereto, and an inflatable pouch or pouches filling the space between the hub and the tire and affording a yieldable cushion for the latter, said tire being seated against the circumferential edge of the pouch or pouches.

2. An inflatable wheel comprising a hub, side members rigid with said hub and provided with peripheral tire-flanges, an elastic solid tire having its inner edge portion slidably and yieldably confined between the flanges of said side members, and an inflatable pouch or pouches filling the space between the tire and the hub and also between the side members, said tire being seated against the circumferential edge of the pouch or pouches which afford a yieldable cushion for the tire.

3. An inflatable wheel comprising a hub, side members rigid with said hub, a tire yieldably held between the peripheral edge portions of the side members, and a series of arcuate inflatable pouches filling the space between the hub and the tire and affording a yieldable cushion for the latter, each pouch having side walls joined by radial end walls and by inner and outer curved walls.

4. An inflatable wheel having a hub, side members attached thereto, a cushion formed by an intermediate pouch or pouches, a tire seated directly on the rim of said cushion and having its inner edge fitted between said side members and fasteners engaging slidably with said side members and confining the tire against radial and lateral displacement relative to said cushion and the side members.

5. An inflatable wheel having side members provided with radial slots, a cushion formed by an inflatable pouch or pouches confined laterally between the side members, a tire seated directly on the rim formed by said cushion, and bolts attached to the tire and fitted slidably in the slots of the side members.

6. An inflatable wheel comprising a hub, side members rigid with said hub, a tire yieldably held between the peripheral edge portions of the side members, and a series of inflatable pouches filling the space between the hub and the tire and affording a yieldable cushion for the latter, said tire being seated against the circumferential edges of the cushions; each pouch being made of yieldable material with radial end walls arranged to meet with similar walls of adjacent pouches, and all the pouches being laterally confined by the side members.

7. An inflatable wheel comprising a hub, side members rigid therewith, a tire yieldably held between said side members, a series of inflatable pouches filling the space between the hub and the tire, and a pressure-distributing means connected individually with the pouches of the series.

8. An inflatable wheel comprising a hub, side members rigid therewith, a tire yieldably confined between the side members, a series of inflatable pouches filling the space between the hub and the tire, and a curved pressure-distributing pipe having individual connection with the pouches, each connection having a check-valve.

9. An inflatable wheel comprising a hub, side members rigid therewith, a tire yieldably confined between the side members, a series of inflatable pouches filling the space between the hub and the tire and said pouches engaging with one another on radial lines of division between them, a pressure-distributing pipe having individual connection with the pouches of the series, and means for supplying an inflating medium to said pipe.

10. An inflatable wheel having a series of pouches disposed in abutting relation and confined laterally between unyieldable side plates, a distributing-pipe mounted on one of said plates, and a series of valved branches communicating with the pipe and extending through openings in one side plate and having communication with the pouches.

11. An inflatable wheel comprising a hub, side members rigid with said hub, a tire yieldably confined between said members, and a series of inflatable pouches filling the space between the hub and the tire and affording a yieldable cushion for the latter, said pouches having individual interlocking engagement with the side members and sustained laterally thereby.

12. An inflatable wheel comprising a hub, side members rigid with said hub, a tire yieldably confined between the side members, and a series of inflatable pouches filling the space between the hub and the tire and affording a yieldable cushion for the latter, each pouch of the series having at its circumference an interlocking engagement with the inner edge of the tire.

13. An inflatable wheel comprising a hub, side members rigid with said hub, a tire yieldably confined between the side members, and a cushioned body filling the space between the tire and the hub and formed by an inflatable pouch or pouches, said body being laterally confined between the side members and having interlocking engagement with the inner edge of the tire and with the side members.

14. An inflatable wheel comprising a hollow axle forming a storage-reservoir, a hub on said axle, side members rigid with the hub, a tire yieldably confined between the side members, a cushion-body filling the space between the tire and the hub and laterally confined between the side members, and a pipe attached to the axle and to the cushion-body to establish communication therebetween.

In testimony whereof I have signed my name to this specification in the presence of two subscribing witnesses.

ALEXANDER HONRATH.

Witnesses:
H. T. BERNHARD,
EVERARD BOLTON MARSHALL.